(12) United States Patent
Hornick et al.

(10) Patent No.: US 12,012,944 B1
(45) Date of Patent: Jun. 18, 2024

(54) WATER-DRIVEN GENERATOR

(71) Applicants: Edward Carl Hornick, Rainbow, TX (US); Darla Rae Hornick, Rainbow, TX (US)

(72) Inventors: Edward Carl Hornick, Rainbow, TX (US); Darla Rae Hornick, Rainbow, TX (US)

(*) Notice: Subject to any disclaimer, the term of this patent is extended or adjusted under 35 U.S.C. 154(b) by 7 days.

(21) Appl. No.: 17/962,473

(22) Filed: Oct. 8, 2022

Related U.S. Application Data

(60) Provisional application No. 63/253,585, filed on Oct. 8, 2021.

(51) Int. Cl.
*F03G 1/08* (2006.01)
*F03B 7/00* (2006.01)

(52) U.S. Cl.
CPC ............. *F03G 1/08* (2013.01); *F03B 7/00* (2013.01); *F05B 2220/706* (2013.01)

(58) Field of Classification Search
CPC ... F03G 1/00; F03G 1/02; F03G 1/022; F03G 1/024; F03G 1/026; F03G 1/08; F03B 7/00; F05B 2220/706
See application file for complete search history.

(56) References Cited

U.S. PATENT DOCUMENTS

| | | | | |
|---|---|---|---|---|
| 1,174,454 | A * | 3/1916 | Taliaferro | F03G 1/00 185/43 |
| 4,371,058 | A * | 2/1983 | Holley | F03G 1/00 60/407 |
| 9,562,519 | B1 * | 2/2017 | Gardner | H02K 21/12 |
| 2020/0248677 | A1 * | 8/2020 | Utata | F03G 1/08 |
| 2021/0246866 | A1 * | 8/2021 | Blodgett | F03B 3/145 |
| 2022/0205422 | A1 * | 6/2022 | Park | F03B 17/06 |

FOREIGN PATENT DOCUMENTS

| | | | | |
|---|---|---|---|---|
| CN | 101960693 | A * | 1/2011 | F03B 7/00 |
| CN | 108561260 | A * | 9/2018 | F03B 13/14 |
| DE | 202012003533 | U1 * | 6/2012 | F03B 17/06 |

\* cited by examiner

*Primary Examiner* — Phillip A Johnson
(74) *Attorney, Agent, or Firm* — Kenneth L. Tolar

(57) ABSTRACT

A water-driven generator for harvesting energy produced by naturally flowing water sources and storing the energy to later produce electricity when needed includes a housing with a plurality of linear spring motors received therein that are connected to an internal drive shaft. A first end of the drive shaft is coupled with a waterwheel submerged within a naturally flowing stream to wind the spring motors when the main power grid is operational. The opposing end of the drive shaft is operably connected to a generator so that the wound springs produce electricity whenever emergency power is needed.

6 Claims, 2 Drawing Sheets

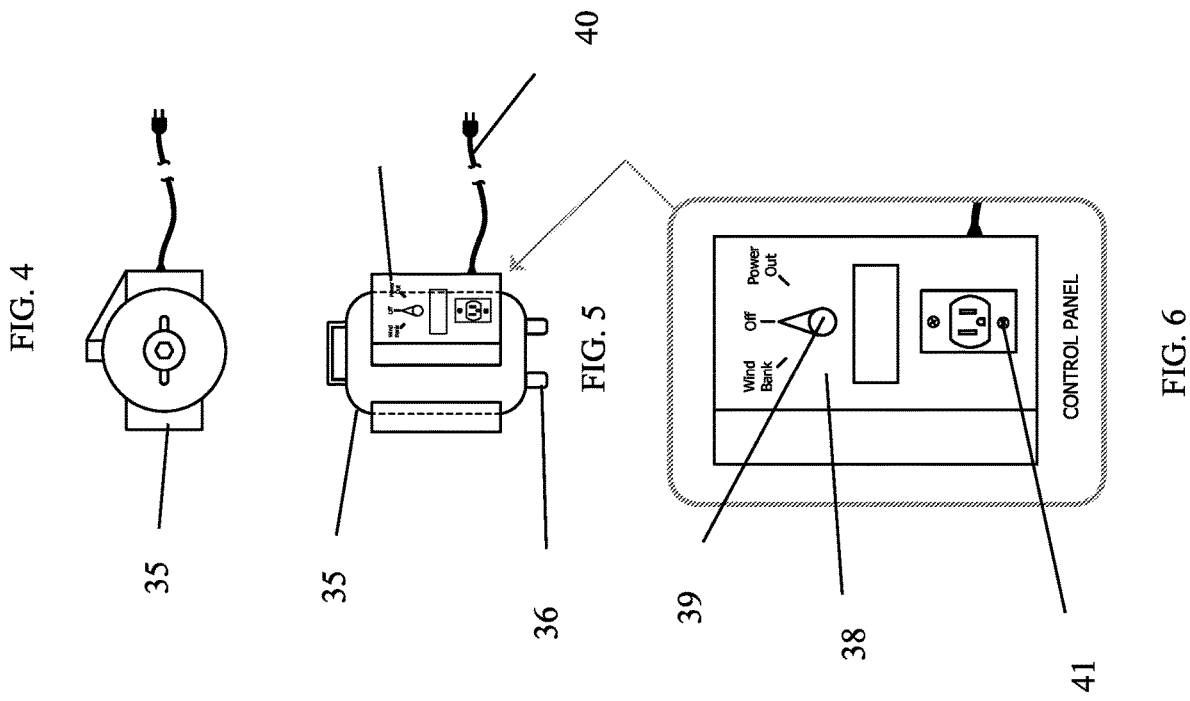
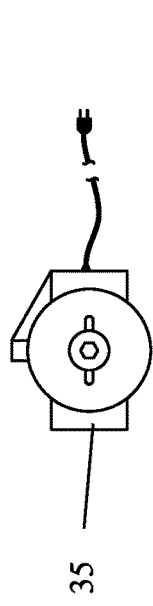
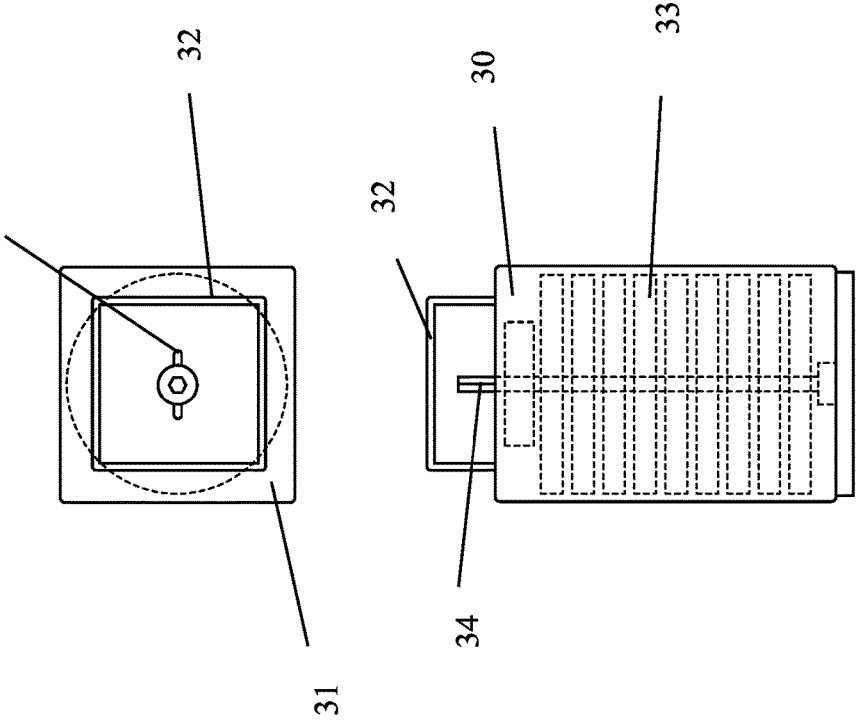

WATER-DRIVEN GENERATOR

CROSS REFERENCE TO RELATED APPLICATIONS

This application claims priority of provisional application No. 63/253,585 filed on Oct. 8, 2021, the specification of which is incorporated herein by reference.

BACKGROUND OF THE INVENTION

The present invention relates to a generator that stores energy harvested from naturally flowing water sources and uses the stored energy to produce electricity.

DESCRIPTION OF THE PRIOR ART

A conventional generator uses hydrocarbons, such as gasoline or natural gas, to produce electricity during a power outage. Operating a conventional generator not only pollutes the environment but also depletes valuable petroleum reserves. Though solar panels and windmills generate cleaner energy, they are inefficient, expensive to install and are not suited for all climates. No known clean-energy solutions attempt to harvest and store kinetic energy generated by rivers, streams, or other naturally flowing water sources for later use during a power outage.

Accordingly, there is currently a need for a means of efficiently generating electricity without using hydrocarbon fuel sources. The present invention addresses this need by providing a generator having multiple spring motors that are wound by flowing water to store energy that can later drive a generator shaft to produce electricity when needed.

SUMMARY OF THE INVENTION

The present invention relates to a water-driven generator for harvesting energy produced by naturally flowing water sources and storing the energy to later produce electricity when needed. The device includes a housing with a plurality of linear spring motors received therein that are connected to an internal drive shaft. A first end of the drive shaft is coupled with a waterwheel submerged within a naturally flowing stream to wind the spring motors when the main power grid is operational. The opposing end of the drive shaft is operably connected to a generator shaft so that the wound springs produce electricity whenever emergency power is needed.

It is therefore an object of the present invention to provide a generator that uses no hydrocarbons or other fuels to produce electricity.

It is yet another object of the present invention to provide an electrical generator that is powered by a naturally flowing water source.

It is therefore another object of the present invention to provide an electrical generator that has no adverse environmental impact.

Other objects, features, and advantages of the present invention will become readily apparent from the following detailed description of the preferred embodiment when considered with the attached drawings and the appended claims.

BRIEF DESCRIPTION OF THE DRAWINGS

FIG. 2 is a front, plan view of the motor mechanism according to a second embodiment of the present invention.

FIG. 3 is a top view of the motor mechanism of FIG. 2.

FIG. 4 is an isolated, bottom view of the generator driven by the motor mechanism of FIGS. 2 and 3.

FIG. 5 is a front view of the generator of FIG. 4.

FIG. 6 is an isolated view of the control panel.

DESCRIPTION OF THE PREFERRED EMBODIMENT

Figure 1:
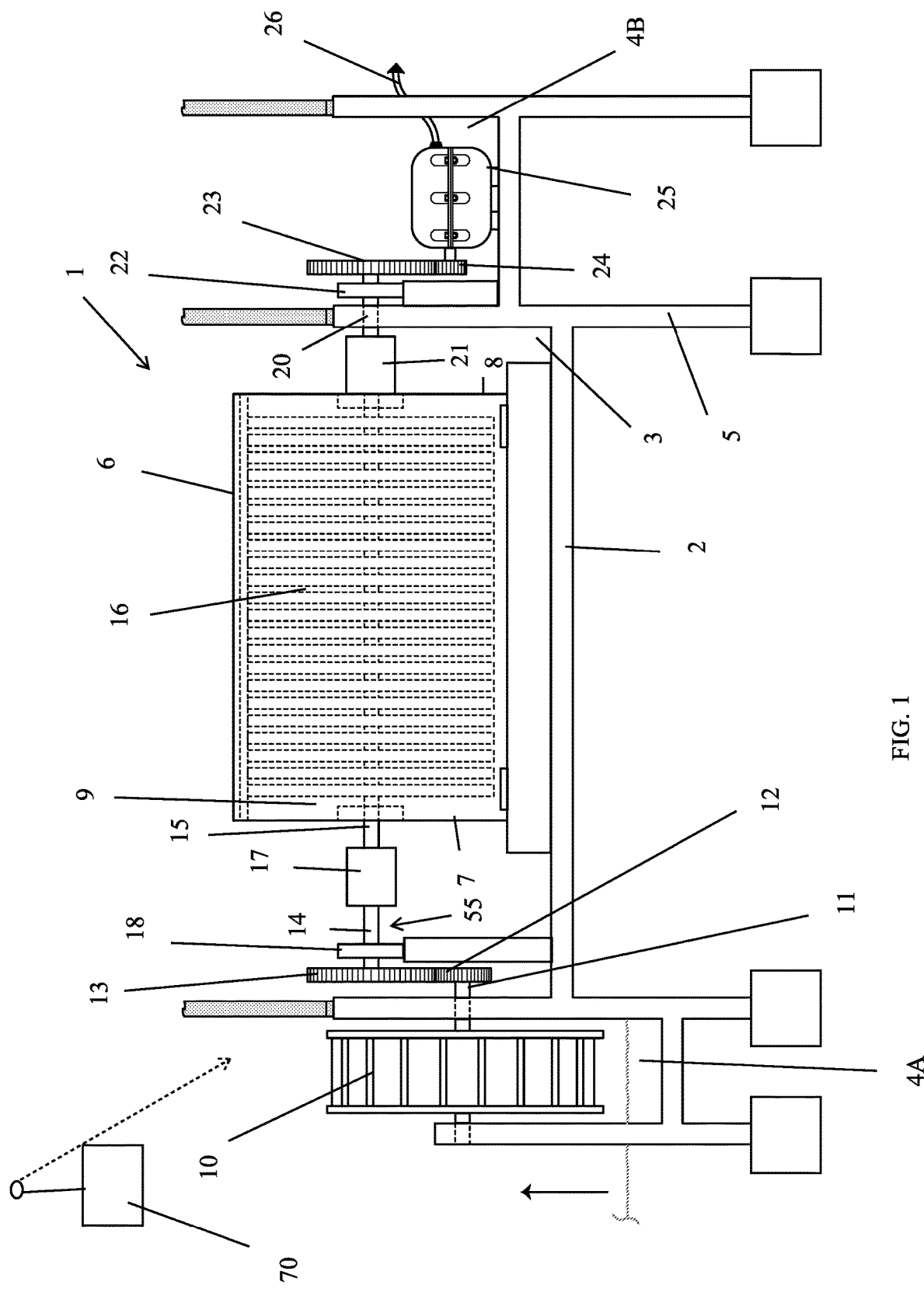
FIG. 1 is a plan view of the generator according to a first embodiment of the present invention.

The present invention relates to a water-driven generator for harvesting energy produced by naturally flowing water sources and storing the energy to later produce electricity when needed. A first embodiment 1 primarily designed for an industrial application includes a support structure 2 having a central compartment 3 and a pair of opposing chambers 4A, 4B. The support structure 2 is preferably constructed with concrete and includes underlying concrete footers 5 that stabilize the structure and all supported components during operation.

Resting within the central compartment 3 is a housing 6 having a front wall 7, a rear wall 8, a pair of sidewalls and an interior chamber 9. Received within a first chamber 4A is a waterwheel 10 partially submerged in a nearby river or similar naturally flowing stream. The waterwheel 10 is mounted on a central axle 11 having a drive gear 12 at a distal end that engages an input gear 13. The input gear 13 is mounted on an input shaft 55 having an outboard segment 14 and an inboard segment 15 that extends through the front wall of the housing 6 and into the interior chamber 9.

Received within the interior chamber 9 are a plurality of linear or constant-force spring motors 16 that are operably connected to the inboard segment 15 of the input shaft 55. Accordingly, moving water rotates the waterwheel 10 and input shaft 55 in a first direction to wind the spring motors, which then bias the input shaft 55 in the opposing direction. An input clutch 17 selectively connects the inboard 15 and outboard segments 14 of the input shaft 55 according to a predetermined command from an electronics module or a controller 70. The inboard segment 15 and outboard segment 14 are each positioned within a bearing assembly 18 to maintain the shaft components in proper alignment while providing a smooth, frictionless surface in which the shaft 55 rotates. When the controller 70 determines that all the spring motors are fully loaded, it transmits a command signal to the input clutch 17 to disconnect the inboard 14 and outboard 15 segments. If the controller determines that the motors are less than completely wound, it reconnects the segments to top-off the stored energy. A conventional electromagnetic brake or similar mechanism locks the input shaft 55 when the springs are fully wound until released by the controller for driving a conventional electrical generator as described, infra.

A distal end of the inboard segment extends from the rear wall and is selectively coupled to an output shaft 20 by a second clutch mechanism 21. The output shaft 20 is received within a bearing assembly 22 and includes a drive gear 23 at a distal end that engages an input gear 24 on a conventional electrical generator 25. The generator 25 seats within the second chamber 4B and includes an outlet cable 26 that is connected to the industrial facility's main power grid. The controller 70 activates the output clutch 21 that couples the input 55 and output shafts 20 to allow the wound springs to drive the electrical generator 25 whenever the main power is unavailable. The gear ratios are such that minimal rotation of the input shaft 55 results in numerous rotations of the input gear 24.

Now referring to FIGS. 2-6, a portable embodiment that is designed to power individual households or other smaller applications includes a housing 30 having a top wall 31, a bottom wall, a plurality of sidewalls and an interior chamber. The top wall includes a square or rectangular handle 32 that allows the generator to be conveniently transported to a desired location.

Received within the interior chamber are a plurality of linear spring motors 33 that are wound by a drive shaft 34 partially protruding through the housing top wall. Superimposable on the housing top wall is a motor mechanism 35 that rotates the drive shaft in a first direction to wind the spring motors and in an opposite direction to generate electricity. The motor mechanism includes a casing having a bottom surface, an exterior surface, and an upper end. Protruding from the bottom surface are a pair of tabs 36 that fit within mating openings 37 adjacent the drive shaft to properly couple the drive shaft with the internal motor mechanism shaft. The rectangular handle also guides the motor mechanism into a properly aligned position relative to the drive shaft. A waterwheel or other similar mechanism may also be used in lieu of the above-described motor mechanism 35.

On the exterior surface of the casing is a control panel 38 including a dial 39 that allows a user to select either a winding or a powering operation as desired. An electrical cable 40 connects the motor mechanism to the main power grid to wind the motors using existing power when the generator is in standby mode. An electrical outlet 41 adjacent the dial allows connection of an electrical appliance when the device is generating backup power. Internal electronics control output voltage to the household appliance in a conventional fashion. Accordingly, while a primary source of power is available, the motor mechanism winds the spring motors until needed. If the primary source of power is unavailable, a user can switch to the powering operation whereby the spring motors rotate the motor mechanism shaft in an opposite direction to produce electricity.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An emergency electrical generator comprising:
   a housing having a spring motor received therein;
   an input shaft connected to said spring motor, said input shaft having an inboard segment and an outboard segment;
   a waterwheel mounted on a central axle and submerged within a flowing water stream;
   a first gear attached to said central axle;
   a second gear engaging said first gear and attached to the outboard segment of said input shaft whereby moving water rotates the waterwheel and input shaft to wind the spring motor;
   an output shaft connected to an input drive shaft on an electrical generator;
   means for selectively connecting said inboard segment of said input shaft to said output shaft to allow said spring motor to drive said input drive shaft to produce electricity;
   a cable extending from said electrical generator to a power grid.

2. The emergency generator according to claim 1 wherein said means for selectively connecting said input shaft to said output shaft to allow said spring motor to drive said input drive shaft to produce electricity comprises:
   a first clutch mechanism selectively connecting said input shaft and said output shaft upon receipt of a predetermined command;
   a first controller in communication with said first clutch mechanism, said first controller transmitting said predetermined command to said first clutch mechanism upon detecting that a main power source is unavailable.

3. The emergency generator according to claim 1 further comprising:
   a support structure including a central compartment, a first chamber and a second opposing chamber, said waterwheel received within said first chamber, said electrical generator received within said second chamber and said housing received within said central compartment.

4. The emergency generator according to claim 1 further comprising a motor coupled with said input shaft for winding said spring motor when a main power source is available.

5. The emergency generator according to claim 1 further comprising a means for selectively connecting the inboard segment of said input shaft to the outboard segment of said input shaft to allow said waterwheel to wind said spring motor.

6. The emergency generator according to claim 5 wherein said means for selectively connecting the inboard segment of said input shaft to the outboard segment of said input shaft to allow said waterwheel to wind said spring motor comprises:
   a second clutch mechanism selectively connecting the inboard segment of said input shaft and the outboard segment of said input shaft upon receipt of a second predetermined command;
   a second controller in communication with said second clutch mechanism, said second controller transmitting said second predetermined command to said second clutch mechanism upon detecting that said spring motor is not wound.

* * * * *